(12) United States Patent
Gopalakrishnan et al.

(10) Patent No.: US 10,815,954 B2
(45) Date of Patent: Oct. 27, 2020

(54) STARTER FOR AN INTERNAL COMBUSTION ENGINE

(71) Applicant: GM Global Technology Operations LLC, Detroit, MI (US)

(72) Inventors: Suresh Gopalakrishnan, Troy, MI (US); Lei Hao, Troy, MI (US); Chandra S. Namuduri, Troy, MI (US); Paul S. Lombardo, Ferndale, MI (US); Jeffrey R. Aldrich, Davison Township, MI (US); Chunhao J. Lee, Troy, MI (US); Neeraj S. Shidore, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 93 days.

(21) Appl. No.: 15/967,904

(22) Filed: May 1, 2018

(65) Prior Publication Data
US 2019/0338743 A1   Nov. 7, 2019

(51) Int. Cl.
*F02N 11/00* (2006.01)
*F02N 11/08* (2006.01)
*H02P 6/17* (2016.01)
*H02P 6/08* (2016.01)

(52) U.S. Cl.
CPC ............ *F02N 11/0851* (2013.01); *H02P 6/08* (2013.01); *H02P 6/17* (2016.02)

(58) Field of Classification Search
CPC ................ F02N 11/08; F02N 11/0851; F02N 2200/022; F02N 2200/041; F02N 2200/048; F02N 2300/102; H02P 6/17; H02P 6/08; H02P 6/20
See application file for complete search history.

(56) References Cited

U.S. PATENT DOCUMENTS

| 6,992,403 B1 * | 1/2006 | Raad ........................ F02C 7/275 290/10 |
| 8,816,556 B2 * | 8/2014 | Hao .......................... H02K 1/30 310/156.01 |
| 10,190,561 B1 * | 1/2019 | Hao ..................... F02N 11/0851 |

(Continued)

FOREIGN PATENT DOCUMENTS

| DE | 4430650 A1 | 3/1995 |
| DE | 102017112296 A1 | 12/2017 |

*Primary Examiner* — Phutthiwat Wongwian
*Assistant Examiner* — Sherman D Manley
(74) *Attorney, Agent, or Firm* — Quinn IP Law (57) ABSTRACT

An engine starter system includes a starter including a multi-phase brushless electric motor and an electronic commutator assembly. A controller includes an instruction set that is executable in response to a command to execute an engine starting event. Operation includes determining a desired starting profile, controlling the starter to engage a rotatable member of the engine, and monitoring the rotational speed of the electric motor via a rotor position sensing circuit. The starter inverter is dynamically controlled to control the electric motor to spin the rotatable member of the internal combustion engine responsive to the desired starting profile, including dynamically controlling the starter inverter to control the electric motor to control the spin of the engine responsive to the desired starting profile to prevent occurrence of an engine speed flare event during the engine starting event.

15 Claims, 8 Drawing Sheets

(56) References Cited

U.S. PATENT DOCUMENTS

| | | | |
|---|---|---|---|
| 2003/0038482 A1 | 2/2003 | Dubus et al. | |
| 2003/0107348 A1* | 6/2003 | Inagawa | H02P 6/20 |
| | | | 322/22 |
| 2005/0229889 A1* | 10/2005 | Hoevermann | F02D 41/009 |
| | | | 123/179.4 |
| 2009/0063028 A1 | 3/2009 | Aitchison et al. | |
| 2012/0150371 A1 | 6/2012 | Swales et al. | |
| 2012/0256523 A1* | 10/2012 | Fulton | F02N 11/02 |
| | | | 310/68 D |
| 2012/0256524 A1* | 10/2012 | Fulton | F02N 15/067 |
| | | | 310/68 E |
| 2013/0133604 A1* | 5/2013 | Gray | F02N 11/0851 |
| | | | 123/179.3 |
| 2013/0133605 A1* | 5/2013 | Neet | F02N 11/08 |
| | | | 123/179.3 |
| 2013/0221681 A1* | 8/2013 | Bradfield | F02N 15/06 |
| | | | 290/38 C |
| 2013/0221682 A1* | 8/2013 | Bradfield | F02N 11/0855 |
| | | | 290/38 C |
| 2014/0035501 A1* | 2/2014 | Harada | H02P 6/16 |
| | | | 318/400.35 |
| 2014/0260792 A1* | 9/2014 | Bradfield | F02N 11/0855 |
| | | | 74/7 A |
| 2014/0319957 A1* | 10/2014 | Hao | H02K 17/16 |
| | | | 310/211 |
| 2015/0258882 A1* | 9/2015 | Holmes | B60K 6/485 |
| | | | 180/65.26 |
| 2015/0260145 A1* | 9/2015 | Holmes | F02N 15/06 |
| | | | 74/8 |
| 2017/0217426 A1* | 8/2017 | Hansen | F02P 5/1504 |
| 2018/0258900 A1* | 9/2018 | Namuduri | F02N 11/0848 |

* cited by examiner

STARTER FOR AN INTERNAL COMBUSTION ENGINE

INTRODUCTION

Internal combustion engines may have an electric starter that is disposed to turn a crankshaft leading up to a start event. Engine starting events may include operator-initiated starting events and autostart events.

SUMMARY

A starter system for an internal combustion engine is described, and includes a starter including a multi-phase brushless electric motor and an electronic commutator assembly connected to the electric motor, wherein the electronic commutator assembly includes a rotor position sensing circuit and a starter inverter, and wherein the starter is controllable to engage a rotatable member of the internal combustion engine. A controller is operatively connected to the starter inverter and in communication with the rotor position sensing circuit. The controller includes an instruction set that is executable in response to a command to execute an engine starting event. The instruction set including the steps of determining a desired starting profile for the engine, controlling the starter to engage the rotatable member of the internal combustion engine, and monitoring the rotational speed of the electric motor via the rotor position sensing circuit. The starter inverter is dynamically controlled to control the electric motor to spin the rotatable member of the internal combustion engine responsive to the desired starting profile, including dynamically controlling the starter inverter to control the electric motor to control the spin of the rotatable member of the internal combustion engine responsive to the desired starting profile to prevent occurrence of an engine speed flare event during the engine starting event.

An aspect of the disclosure includes the instruction set executable to dynamically control the starter inverter to control the electric motor to spin the rotatable member of the internal combustion engine responsive to the desired starting profile, including a closed-loop control routine that is executable to dynamically control the starter inverter to control the electric motor to spin the rotatable member of the internal combustion engine responsive to the desired starting profile based upon the monitored rotational speed of the rotor of the electric motor.

Another aspect of the disclosure includes the desired starting profile for the engine being a desired speed profile.

Another aspect of the disclosure includes the desired starting profile for the engine being a desired torque profile.

Another aspect of the disclosure includes the starter including a retractable pinion gear that is selectively extendable to meshingly engage the rotatable member of the internal combustion engine.

Another aspect of the disclosure includes the pinion gear being mechanically connected to a rotor shaft of the electric motor without an overrunning clutch interposed therebetween.

Another aspect of the disclosure includes the rotatable member of the internal combustion engine being a flywheel coupled to a crankshaft.

Another aspect of the disclosure includes the inverter being dynamically controlled to control the electric motor to control the spin of the rotatable member of the internal combustion engine responsive to the desired starting profile to prevent occurrence of the engine speed flare event, wherein the engine speed flare event includes uncontrolled engine speed that is associated with engine firing during the engine starting event.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 6-1 schematically shows an engine start control routine for controlling, via a controller, an embodiment of the starter as part of an effort to effect starting of an embodiment of the engine.

FIG. 6-2 schematically shows a torque-based closed-loop autostart control routine to control an embodiment of the starter as part of an effort to effect starting of an embodiment of the engine.

FIG. 6-3 schematically shows a speed-based clutch autostart control routine to control an embodiment of the starter as part of an effort to effect starting of an embodiment of the engine.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. Furthermore, the disclosure, as illustrated and described herein, may be practiced in the absence of an element that is not specifically disclosed herein.

Figure 1:
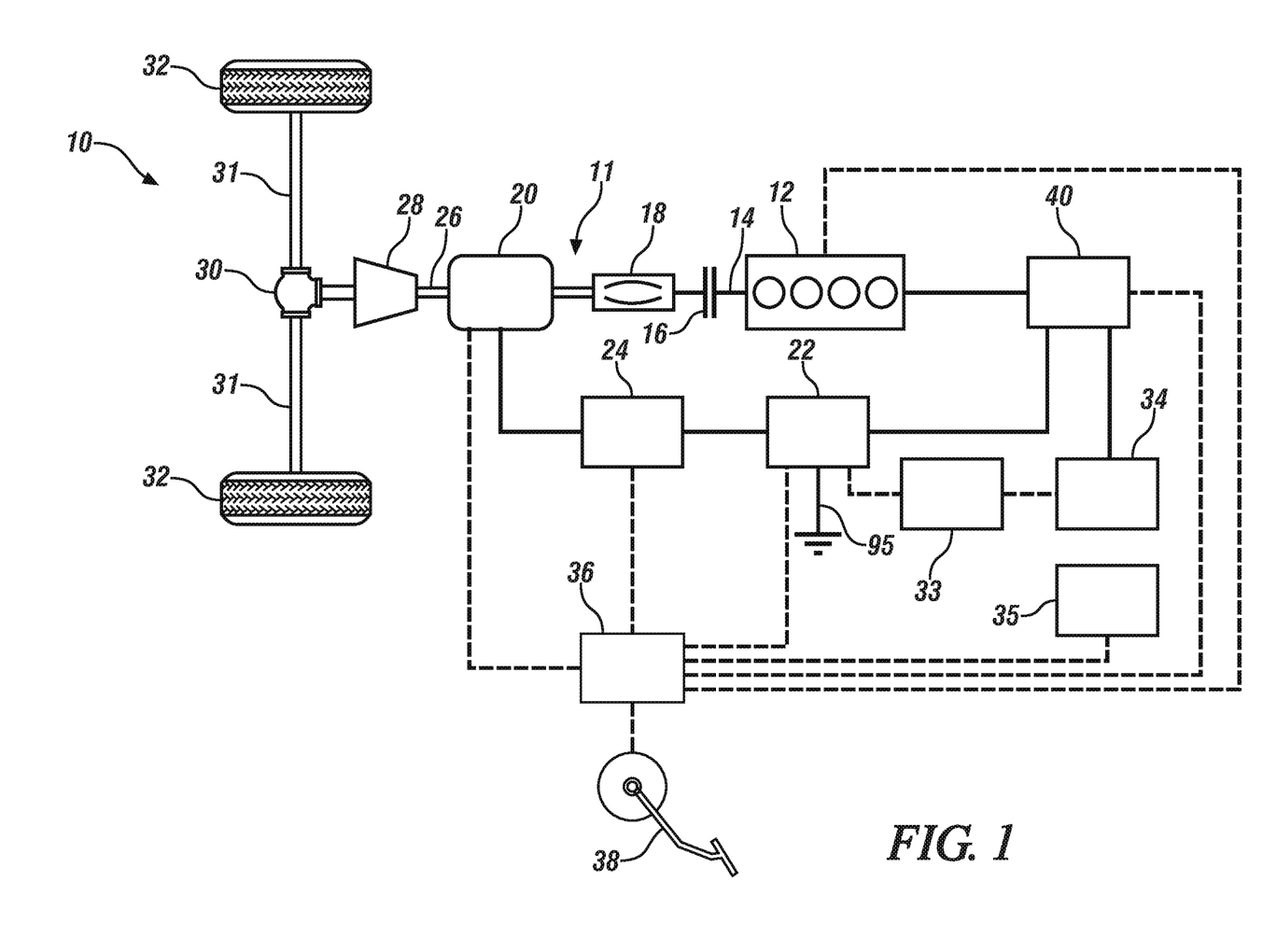
FIG. 1 schematically illustrates a vehicle including a propulsion system with an internal combustion engine and a brushless electric starter therefor.

Referring to the drawings, wherein like reference numerals correspond to like or similar components throughout the several Figures, FIG. 1 shows a system schematic of a vehicle 10 having a driveline 11 that includes a powertrain. The vehicle 10 may have a propulsion system employing solely an internal combustion engine (engine) 12. Alternatively, the vehicle 10 may be a hybrid electric vehicle (HEV) having a powertrain employing both the engine 12 and an electric propulsion source. In the case of the HEV embodiment of the vehicle 10, either or both of the engine 12 and the electric propulsion source may be selectively activated to provide propulsion based on the vehicle operating conditions and other factors.

The engine 12 may be disposed on vehicle 10 in one embodiment, and the vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. Alternatively, the engine 12 may be disposed on a stationary power source.

The engine 12 transfers torque to a shaft 14. One or more decoupling mechanisms may be included along the shaft 14 to decouple torque output of the engine 12 from the remaining portions of the powertrain. A clutch 16 is provided to allow selection of partial or complete torque decoupling of the engine 12. The clutch 16 may be a friction clutch having a plurality of friction plates at least partially engaged when the clutch is closed to transfer torque, and disengaged when the clutch 16 is opened to isolate torque flow between the downstream portions of the powertrain and the engine 12. A torque converter 18 may also be included to provide a fluid coupling between the output portion of engine 12 and downstream portions of the vehicle driveline 11. The torque converter 18 operates to smoothly ramp up torque transfer from the engine 12 to the rest of the driveline 11. Also, the torque converter 18 allows a decoupling of the engine 12, such that the engine 12 may continue to operate at low rotational speed without generating propulsion of the vehicle 10, e.g., at stationary idle conditions.

In the case of the HEV embodiment of the vehicle 10, the electric propulsion source may be a first electric machine 20 powered by a high-voltage external power source and energy storage system including a high-voltage traction battery 22, i.e., a DC power source. In one embodiment, a high-voltage traction battery is one that has an operating voltage that is rated at greater than about 36 volts but less than 60 volts. For example, the traction battery may be a lithium ion high-voltage battery with a nominal voltage of 48 volts. In the HEV embodiment of the vehicle 10, high-voltage direct current is conditioned by an inverter 24 before delivery to the first electric machine 20. The inverter 24 includes a number of switches and a control circuit operating to convert the direct current into three-phase alternating current to drive the first electric machine 20. A negative terminal of the high-voltage traction battery 22 electrically connects to a chassis ground 95.

Additionally, in the case of the HEV powertrain, the first electric machine 20 may have multiple operating modes depending on the direction of power flow. In a motor mode, power delivered from the high-voltage traction battery 22 allows the first electric machine 20 to generate output torque to a shaft 26. The output torque of the first electric machine 20 may then be transferred through a variable ratio transmission 28 to facilitate selection of a desired gear ratio prior to delivery of output torque to a final drive mechanism 30. The final drive mechanism 30 may be a multi-gear differential configured to distribute torque to one or more side- or half-shafts 31 coupled to wheels 32. The first electric machine 20 may be disposed either upstream of the transmission 28, downstream of the transmission 28, or integrated within a housing of the transmission 28.

The first electric machine 20 may also be configured to operate in an electric power generation mode to convert rotational motion of various driveline 11 components into electrical power, including for storage in the high-voltage traction battery 22. When the vehicle 10 is moving, whether propelled by the engine 12 or coasting from its own inertia, rotation of the shaft 26 turns an armature, or rotor, (not shown) of the first electric machine 20. Such rotational motion causes an electromagnetic field to generate alternating current that is passed through the inverter 24 for conversion into direct current. The direct current may then be provided to the high-voltage traction battery 22 to replenish its state of charge. A unidirectional or bidirectional DC-DC converter 33 may be used to charge a low-voltage (e.g., 12 volt) battery 34 and supply low voltage loads 35, such as 12 volt loads. When a bidirectional DC-DC converter 33 is used, it is possible to jumpstart the high-voltage traction battery 22 from the low-voltage battery 34. Either the low-voltage battery 34 or the high-voltage traction battery 22 may be employed to supply electric power to the starter 40 to spin and start the engine 12.

The various propulsion system components discussed herein may have one or more associated controllers to control and monitor operation. An electronic controller 36, although schematically depicted as a single controller, may also be implemented as a system of cooperative controllers to collectively manage the propulsion system. Multiple controllers may be in communication via a serial bus (e.g., Controller Area Network (CAN)) or via discrete conductors. The controller 36 includes one or more digital computers, each having a microprocessor or central processing unit (CPU), read only memory (ROM), random access memory (RAM), electrically-programmable read only memory (EPROM), a high speed clock, analog-to-digital (A/D) and digital-to-analog (D/A) circuitry, input/output circuitry and devices (I/O), as well as appropriate signal conditioning and buffering circuitry. The controller 36 may also store a number of algorithms or computer executable instructions needed to issue commands to perform actions according to the present disclosure.

The controller 36 is programmed to monitor and coordinate operation of the various herein discussed propulsion system components. The controller 36 is in communication with the engine 12 and receives signals indicating engine speed, coolant temperature, and/or other engine operating conditions. The controller 36 may also be in communication with the first electric machine 20 and receive signals indicating motor speed, torque, and current draw. The controller 36 may also be in communication with the high-voltage traction battery 22 and receive signals indicating such status indicators as a battery state of charge (SOC), battery temperature, and current draw. The controller 36 may also receive signals indicating the circuit voltage across the high-voltage bus. The controller 36 may further be in communication with one or more sensors disposed to monitor driver input pedal(s) 38 to receive signals indicating a specific pedal position, which may reflect an acceleration demand by the driver. The driver input pedal(s) 38 may include an accelerator pedal and/or a brake pedal in one embodiment. In alternative embodiments such as a self-driving autonomous vehicle, acceleration demand may be determined by a computer either on-board the vehicle 10 or external to the vehicle.

As mentioned above, in the case of the HEV embodiment of the vehicle 10, either one or both of the engine 12 and the first electric machine 20 may be operated at a particular time based at least on the propulsion requirements of the subject vehicle. During high torque demand conditions, the controller 36 may cause both the engine 12 and the first electric machine 20 to be activated, such that each of the propulsion sources provides respective output torque for simultaneous or combined propulsion of the vehicle 10. In certain moderate torque demand conditions, the engine 12 operates efficiently and may be used as the sole propulsion source. For example, during highway driving of the HEV at a relatively constant speed, the first electric machine 20 may be deactivated, such that only the engine 12 provides output torque.

Under other operating conditions of the HEV, the engine 12 may be deactivated, such that only the first electric machine 20 provides output torque. The clutch 16 may be opened to decouple the shaft 14 from the downstream portions of the powertrain. Specifically, during coast conditions where the HEV's driver allows the vehicle 10 to decelerate under driveline and road friction, as well as air resistance, the engine 12 may be deactivated and the first electric machine 20 operated in generator mode to recover energy. Additionally, even in a vehicle 10 employing only the engine 12 for propulsion, deactivation of the engine 12 may be desirable during a temporary vehicle stop, such as at a traffic light. Instead of allowing the engine 12 to idle, fuel consumption may be reduced by deactivating the engine while the vehicle 10 is stationary. In both examples, it may be beneficial to rapidly restart the engine 12 in response to a subsequent resumption or increase of propulsion demand. A prompt startup of the engine 12 may avoid roughness and/or latency in power delivery being perceived by a driver of the vehicle 10.

The vehicle 10 also includes a second electric machine, hereafter referred to as starter 40, which employs a multi-phase brushless electric motor 54. The starter 40 is coupled to the engine 12, and is disposed to generate cranking torque as part of an engine starting event, including being employed in an engine stop-start routine.

When the starter 40 is engaged with the engine 12 leading up to an engine starting event, the starter 40 turns a crankshaft of the engine 12 to facilitate starting thereof, which can be a cold start event, a warm start event, or an autostart event. Specifically, the starter 40 is configured to engage with and selectively apply an input torque T to an external ring gear 12A that is attached to a crankshaft flywheel or flex-plate (not shown) of the engine 12, in order to spin the crankshaft of the engine 12. According to aspects of the present disclosure, the controller 36 is programmed to issue a command to start the engine 12 employing the starter 40 in response to an acceleration demand, such as detected via sensor(s) (not shown) at driver input pedal(s) 38, following an autostop event, such as may occur in response to a period of reduced acceleration demand.

Figure 2:
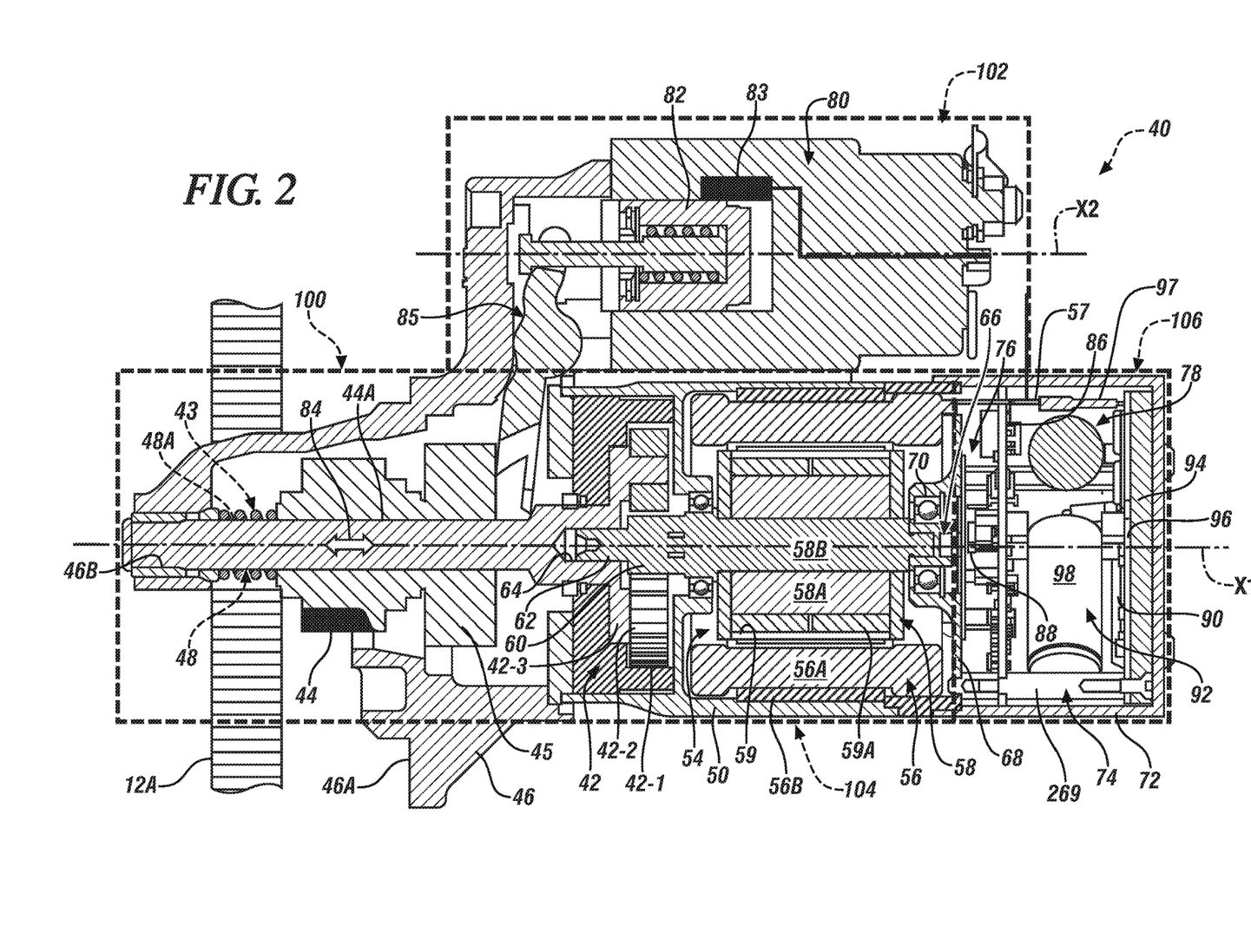
FIG. 2 illustrates a cutaway side-view that depicts a cross-sectional side view of the starter shown in FIG. 1.
Figure 3:
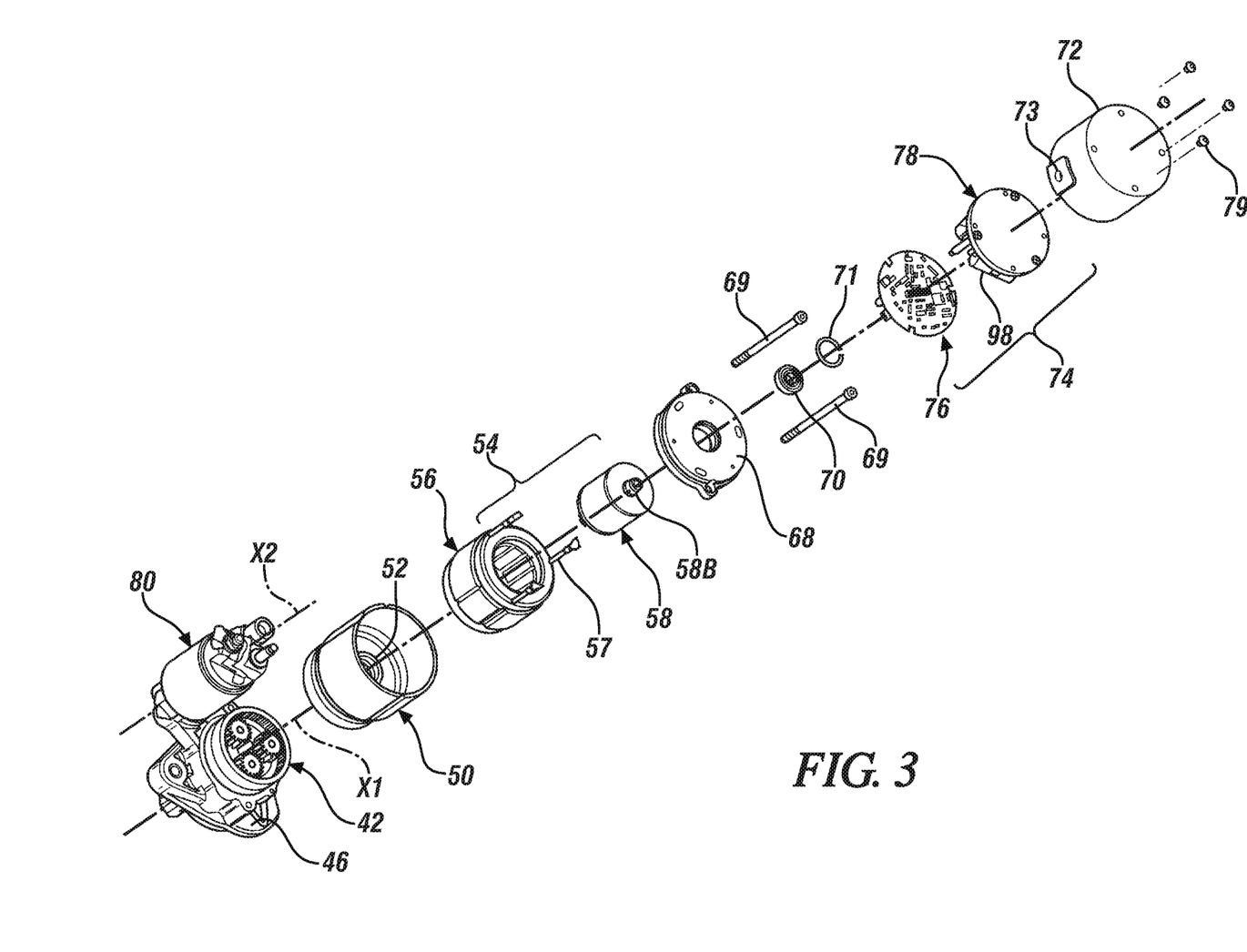
FIG. 3 illustrates an exploded isometric back view of the starter shown in FIG. 2.
Figure 4:
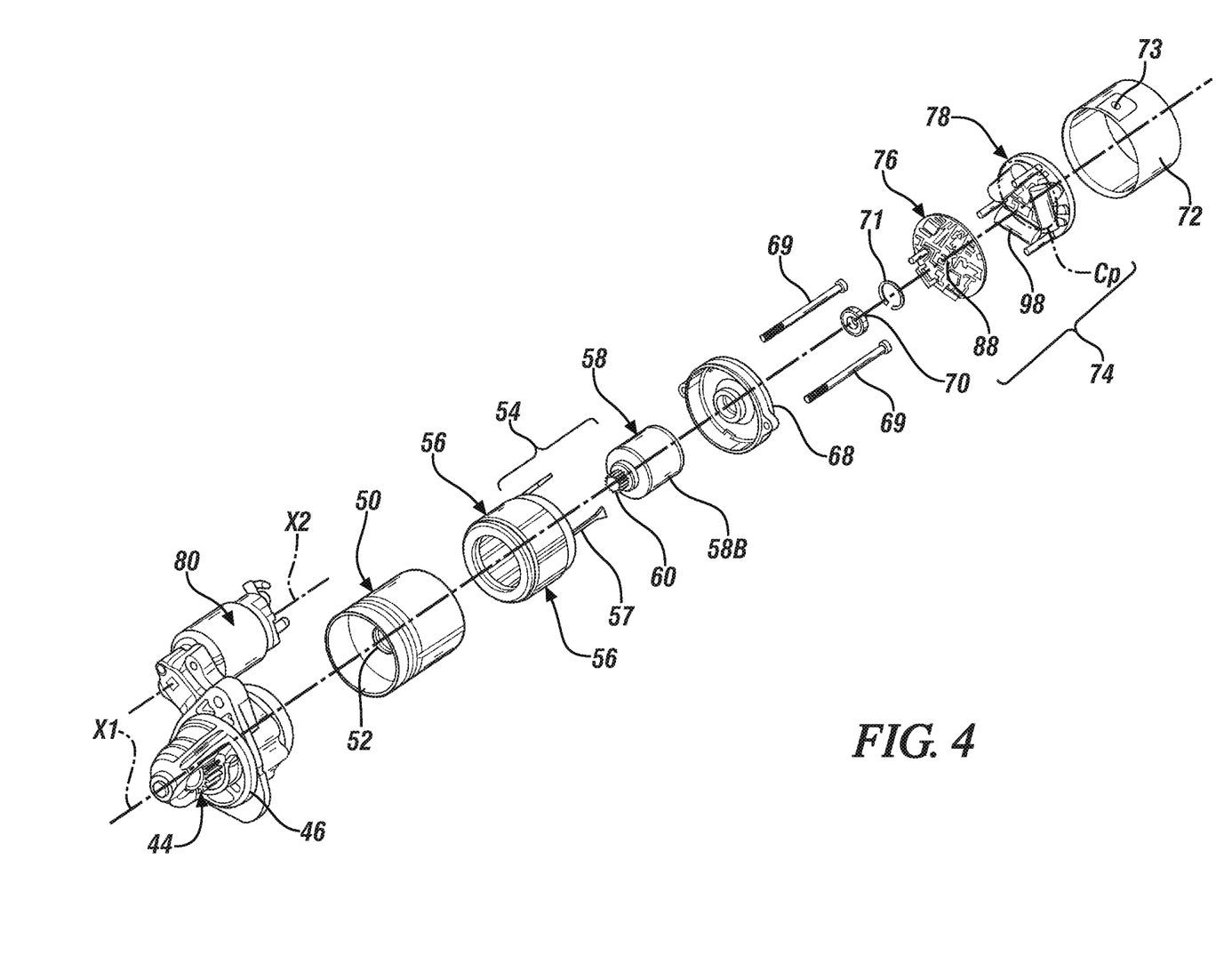
FIG. 4 illustrates an exploded isometric front view of the starter shown in FIGS. 2 and 3.

As shown in FIGS. 2-4, the starter 40 is configured as an on-axis electric machine. As defined herein, "on-axis" indicates that the starter 40 is designed and constructed such that the starter's gear-train components, electric motor, and electronic commutator assembly are arranged on a common first axis X1. The starter 40 includes a partial planetary gear set 42 that is operatively connected to a starter pinion gear 44 via a housing 45, and is configured to translate along the first axis X1. A spring 43 is disposed on the shaft 48 to urge the pinion gear 44 to a disengaged state. The partial planetary gear set 42 provides a speed reduction, such as between 25:1 and 55:1, to output cranking torque at the engine crankshaft as a desired cranking speed. As described with reference to FIGS. 2-4, the starter 40 includes a gear-set casing 46 that is configured to house the partial planetary gear set 42 and has a mounting flange 46A for attachment to the engine 12 via appropriate fasteners.

The partial planetary gear set 42 includes an internal ring gear 42-1 fixed to the gear-set casing 46. The partial planetary gear set 42 further includes a plurality of planet gears 42-2 in mesh with the internal ring gear 42-1, and a planet carrier 42-3 configured to hold the planet gears 42-2. Specifically, the partial planetary gear set 42 may be directly connected to the starter pinion gear 44 via a pinion shaft 48. To such an end, the shaft 48 may include an external spline 48A, while the pinion gear 44 includes matching internal splines 44A, such that the pinion gear 44 is enabled to translate along the pinion shaft 48 when the pinion gear 44 is urged out for engagement with the ring gear 12A on the engine flywheel in one embodiment. As shown, the gear-set casing 46 is configured to support a nose of the shaft 48 via a bearing surface 46B.

The starter 40 also includes a motor casing 50. The gear-set casing 46 may be fixed to the motor casing 50 together with a motor endcap 68, such as via a snap ring 71, which is shown with reference to FIG. 3. The motor casing 50 includes a first bearing 52 and is configured to house the brushless electric motor 54, which is a permanent magnet AC or DC electric motor. The motor endcap 68 may be fastened to the gear-set casing 46 via a plurality of bolts 269. The brushless electric motor 54 may, for example, be one of a number of motor types, such as an induction machine, a surface mount permanent magnet (PM) machine, an interior PM machine, a synchronous reluctance machine, a PM assist synchronous reluctance machine, a drag-cup induction machine, or a switched reluctance machine. The brushless electric motor 54 may also be a radial or an axial flux machine. The wire selection on the brushless electric motor 54 may, for example include a single wire conductor, which may have a round, square, or rectangular cross-section, which may be used for concentrated or distributed winding.

As compared with brushed electric motors, brushless motors may exhibit prolonged service life due to the elimination of physical wear from contact of brushes at the commutator. Further, an electronically commutated electric machine may be capable of more precise control of motor speed as compared to a brushed motor. In some examples, the second electric machine may be operated using a field weakening control strategy to further improve control of the power output. According to aspects of the present disclosure, the rotation of the starter 40 output is synchronized with the rotation of the ring gear 12A to reduce noise, vibration, and harshness (NVH) which may occur during an engine 12 restart event.

FIG. 2 shows a cutaway side-view that depicts a cross-section of the starter 40, and in the exploded view in FIG. 3, the brushless electric motor 54 includes a multi-phase stator assembly 56 having a stator core 56B that is concentrically arranged inside the motor casing 50 with respect to the first axis X1. A number of windings 56A are provided on the stator core 56B to generate a rotating magnetic field. The windings 56A are electrically connected to a power electronics subassembly 78 of an electronic commutator assembly 74 by a plurality of phase leads 57, which are high-temperature (>240 C) rated insulated leads that project linearly outwardly from the brushless electric motor 54, in parallel with the first axis X1 and project towards the electronic commutator assembly 74 to electrically connect therewith. The phase leads 57 are positioned on the outer circumference of stator assembly 56 and are positioned at 120 degrees of mechanical spacing. The phase leads 57 electrically connect to corresponding phase terminals 97, and each of the phase terminals 97 is electrically connected to one of the legs of the starter inverter 140 to conduct phased current. The brushless electric motor 54 also includes a rotor assembly 58 arranged for rotation inside the stator assembly 56. The rotor assembly 58 includes a rotor 58A. The brushless electric motor 54 is driven when the windings 56A are sequentially powered to create a rotating electromagnetic field, and the rotor assembly 58 is caused to rotate when the stator core 56B is thus energized.

The stator core 56B is cylindrical in shape, and defines a hollow central portion to receive the rotor 58A. According to at least one example, outer diameter of the stator core 56B may be limited to no greater than 80 millimeters. The rotor 58A is configured to rotate relative to the stator core 56B about the first axis X1. The rotor 58A may be formed in layers, or laminations, which are stacked in an axial direction along the first axis X1 where the lamination stack defines an active length of the starter 40. According to one example, the lamination stack length is limited to be no greater than 40 millimeters. The overall size of the starter 40 may be dependent on packaging constraints, such that a ratio of the outer diameter of the stator core 56B to the lamination stack length is within a range between about 1.5 and 3.5.

The rotor 58A may define a plurality of openings 59 disposed near the outer perimeter portion of the rotor, and each opening may be configured to hold a permanent magnet 59A. The openings 59 are sized to enhance manufacturability, for example having an opening width of at least about 2 millimeters. The plurality of permanent magnets 59A may be formed from a type of iron-based alloy, such as neodymium, and cooperate to generate a magnetic field which interacts with the stator when energized to cause movement of the rotor 58A. For example, each of the permanent magnets 59A may be rectangular in shape to enhance simplicity and reduce manufacturing costs. However, other magnet shapes may be suitable for specific application of the brushless electric motor 54, according to the present disclosure.

The permanent magnets 59A are arranged to create a number of magnetic poles around the rotor 58A. Each of the permanent magnets 59A is affixed within one of the openings 59 of the rotor 58A and functions as a magnetic pole of the rotating electric machine. Magnetic flux is generated in a direction normal to the body of the magnet 59A. The openings 59 of the rotor 58A may be shaped to include air gaps (not shown) on either side of each permanent magnet 59A. The air gaps between each pole may be sized to reduce flux leakage between the magnetic poles of the rotor 58A. Each permanent magnet 59A is oriented to have an opposing direction of polarity with respect to adjacent magnets in order to generate magnetic flux in opposite directions. The number of poles may be selected according to performance requirements of the brushless electric motor 54.

The rotor assembly 58 includes a shaft 58B. The shaft 58B is arranged on the first axis X1, supported by the first bearing 52, and directly connected to a sun gear 60 configured to engage the partial planetary gear set 42. As shown, the sun gear 60 may be integrally formed with the shaft 58B. A nose 62 of the shaft 58B may be piloted via a bearing surface 64 configured within the shaft 48, such that the shaft 48 and the shaft 58B each rotate about the first axis X1. The rotor assembly 58 also includes a rotor position target magnet 66. As shown in FIG. 2, the rotor position target magnet 66 may be configured as one or more radially or diametrically oriented magnets that are affixed to an end of the rotor shaft 58B. The target may also be fabricated from electrically conductive or soft magnetic materials for use with an inductive sensor with high frequency excitation on the sensor board in place of the Hall effect sensor.

The rotor assembly 58 including shaft 58B, sun gear 60, the partial planetary gear set 42, pinion shaft 48 and pinion gear 44 are arranged without any form of one-way or other overriding clutch interposed therebetween, such that rotation of the rotor assembly 58 is directly mechanically coupled to the rotation of the external ring gear 12A of the engine flywheel when the pinion gear 44 is extended to meshingly engage therewith. As such, the rotational speed of the starter motor is equal to a scalar multiple of the speed of the engine 12 when the pinion gear 44 is extended and meshingly engages the external ring gear 12A.

The brushless electric motor 54 also includes a motor endcap 68 configured to mate with and enclose the motor casing 50. As shown in FIGS. 3 and 4, the motor endcap 68 may be fastened to the gear-set casing 46 via a plurality of bolts 69, and thus retain the motor casing 50 therebetween. The motor endcap 68 includes an aperture providing a mounting structure for a second bearing 70 that is configured to support the shaft 58B for rotation with respect to the first axis X1. As shown in FIGS. 3 and 4, the snap ring 71 may be employed to retain the second bearing 70 within the aperture of the motor endcap 68. The brushless electric motor 54 additionally includes an electronics cover 72 having a power connector 73 (shown in FIGS. 3 and 4) for receiving electrical power from the high-voltage traction battery 22 and a control signal connector (not shown) for communicating with the engine controller to receive autostart and autostop commands. The electronics cover 72 is configured to mate with the motor endcap 68 and house or enclose the electronic commutator assembly 74. The electronic commutator assembly 74 includes a control electronics subassembly 76 and the power electronics subassembly 78, which are encapsulated in a thermally conductive dielectric material to mitigate mechanical shock and vibration, and provide a thermal path to the electronics cover 72 for thermal dissipation. The control electronics subassembly 76 is arranged between the motor endcap 68 and the power electronics subassembly 78. Accordingly, as shown, the brushless electric motor 54 is arranged or sandwiched between the partial planetary gear set 42 and the electronic commutator assembly 74, while the partial planetary gear set 42 is arranged between the starter pinion gear 44 and the electric motor 54. The electronics cover 72 may be attached to the power electronics subassembly 78 via appropriate fasteners, such as screws 79 shown in FIG. 3.

As shown in FIGS. 2-4, the starter 40 additionally includes a solenoid assembly 80. The solenoid assembly 80 includes a pinion-shift solenoid 82 and actuator 83, and the pinion-shift solenoid 82 is arranged on a second axis X2 that is arranged parallel to the first axis X1. The solenoid assembly 80 is configured to be mounted and fastened to the gear-set casing 46, such as via a suitable fastener. The solenoid assembly 80 is further configured to urge the starter pinion gear 44 along the first axis X1, as indicated by arrow 84 to meshingly engage the ring gear 12A to restart the engine 12 upon a command from the controller 36. The pinion-shift solenoid 82 may shift the starter pinion gear 44, for example, via a lever arm 85 (shown in FIG. 2).

The control electronics subassembly 76 may include a processor circuit board 86 arranged perpendicular to the first axis X1, and one or more rotor position sensing circuits 88, such as a Hall effect sensor that is configured to monitor the rotor position target magnet 66. The rotor position sensing circuit 88 is placed so as to maintain a predetermined distance (e.g., 0.5 mm to 1.5 mm) from the rotor position target magnet 66 at the end of the rotor shaft 58B. The power electronics subassembly 78 may include a power circuit board 90 arranged parallel to the processor circuit board 86, an electrical current ripple filter 92, and a heat sink 94 configured to absorb heat energy from the power circuit board 90. The power electronics subassembly 78 may additionally include a thermally conductive electrical insulator 96 arranged between the power circuit board 90 and the electrical current ripple filter 92. The electrical current ripple filter 92 may include a plurality of filter capacitors 98 arranged on a pitch circle Cp (shown in FIG. 4) centered on and perpendicular to the first axis X1. As shown in FIGS. 2-4, each of the plurality of filter capacitors 98 is arranged with a longitudinal axis that is parallel to the power circuit board 90, between the power circuit board 90 and the processor circuit board 86 along the first axis X1.

Embodiments of the rotor position sensing circuit 88 may include raw angular position sensors that provide an incremental or absolute position signal. A position signal from an absolute position sensor is proportional to a true position regardless of whether the rotor is stationary or moving. An incremental position sensor detects positional changes. In one embodiment, the rotor position sensing circuit 88 for use in the present application includes the multiplying encoder or digital Hall sensors, e.g., employing polymer-bonded, multi-pole magnets, and in which encoder/Hall pulses and commutation pulses are generated as signal outputs. The rotor position sensing circuit 88 also includes an intelligent microprocessor-based chip to extract and transmit the position signals. Another sensor is an analog Hall effect sensor, e.g., one employing neodymium magnets, or other field-based sensors operable for generating sine and cosine signals as sensor outputs. Other sensor types generating similar sine and cosine outputs are inductive-type and reluctance-type position sensors, which forego the use of magnets in their operation.

The partial planetary gear set 42, along with the gear-set casing 46, and the starter pinion gear 44 may be part of a first subassembly 100. The solenoid assembly 80 may be part of a second subassembly 102. The motor casing 50, the brushless electric motor 54, and the motor endcap 68 may be part of a third subassembly 104. The electronics cover 72 and the electronic commutator assembly 74 may be part of a fourth subassembly 106. According to the present disclosure, the first subassembly 100 may be configured to be pre-assembled with the second subassembly 102, the third subassembly 104 may be configured to be assembled with the pre-assembled first and second subassemblies 100, 102, and the fourth subassembly 106 is configured to be assembled with the pre-assembled first, second, and third subassemblies 100, 102, 104 to provide a complete electric starter 40. Furthermore, prior to individual subassemblies being assembled into the starter 40, each of the first, second, third, and fourth subassemblies 100, 102, 104, 106 may be separately and individually tested against respective preset operating parameters to verify each subassembly's required performance. In an alternative embodiment, portions of the electronic commutator assembly, e.g., the control electronics subassembly, the power electronics subassembly and/or the heat sink can be disposed at a location that is remote from the three-phase brushless electric motor, such as in the controller 36.

Figure 5:
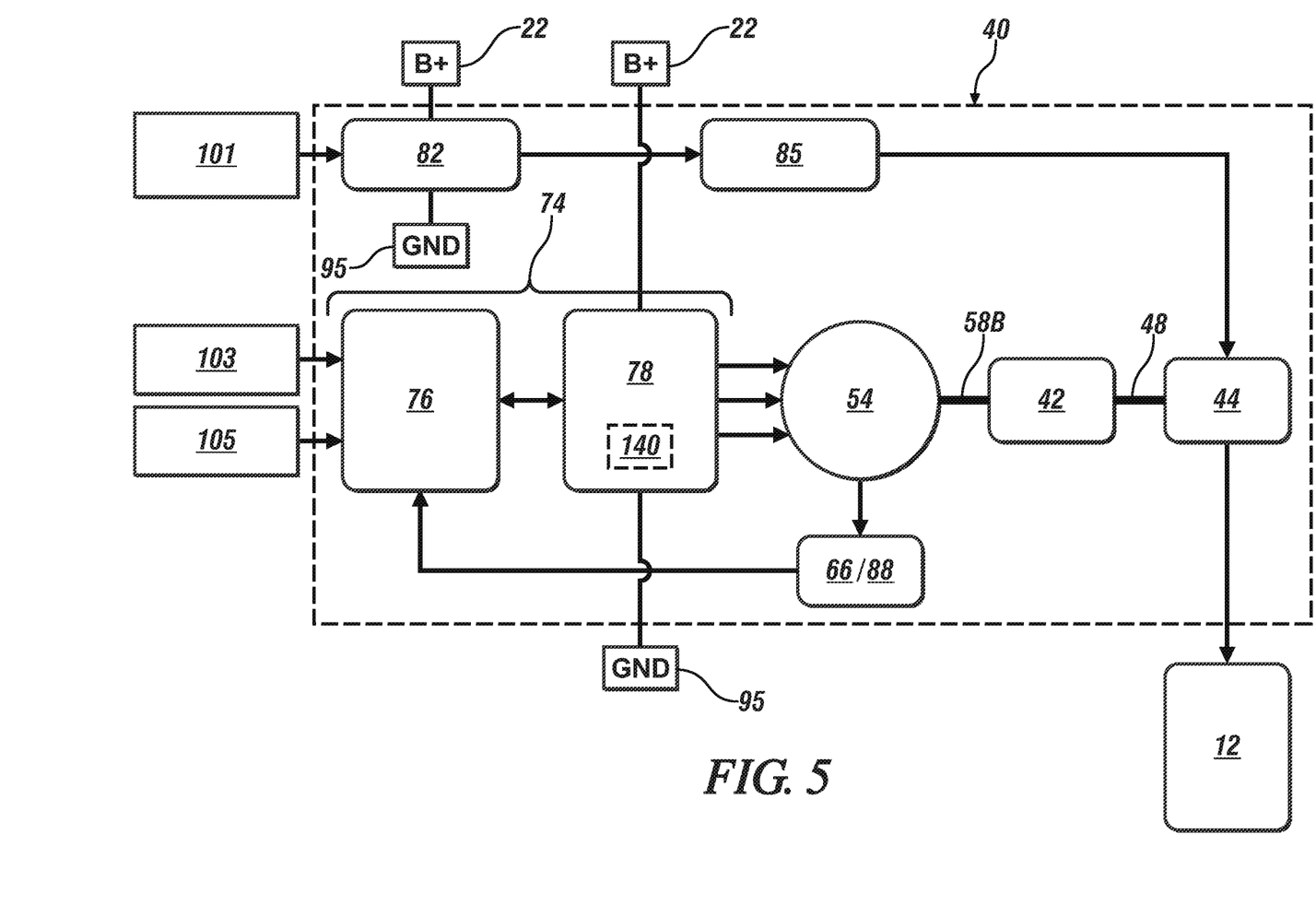
FIG. 5 schematically illustrates a control circuit associated with an embodiment of the starter described with reference to FIGS. 2, 3 and 4.

FIG. 5 schematically illustrates a control circuit associated with an embodiment of the starter 40 described with reference to FIGS. 2, 3 and 4. The starter 40 includes the brushless electric motor 54 including the rotor 58 and rotor shaft 58B that couples via the planetary gearset 42 to the pinion shaft 48. The pinion gear 44 is slidably disposed on the pinion shaft 48. The pinion shift solenoid 82 is controllable to actuate the lever arm 85 to urge the pinion gear 44 to an extended position to meshingly engage the external ring gear 12A of the engine flywheel in response to a pinion control signal 101 that may be generated by the controller 36 as part of an engine starting event. The electronic commutator assembly 74 includes the rotor position sensing circuit 88, the control electronics subassembly 76 and the power electronics subassembly 78. The control electronics subassembly 76 includes a DSP (digital signal processing) controller that is in communication with a plurality of gate drivers and the rotor position sensing circuit 88. The power electronics subassembly 78 includes a starter inverter 140 and other elements. In response to a starter motor control signal 103, the DSP controller controls the gate drivers to generate control signals that are communicated to power switches 142 of the starter inverter 140, which generate current signals that are transferred to the stator windings 56A of the stator 56 to generate a rotating magnetic field to urge the rotor 58A to rotate. Rotation of the rotor 58A and rotor shaft 58B is monitored by the rotor position sensing circuit 88. The controller 36 coincidentally generates the starter motor control signal 103 and the pinion control signal 101 to effect an engine starting event. The starter 40 includes an externally accessible programming communication port that is configured to send and receive messages 105.

As described herein, an acceleration profile is employed to control engine autostart operation of a brushless starter, including profiling engine acceleration responsive to a smooth speed profile, to provide rapid engine starting while minimizing effect of engine speed flare. This includes reducing starter motor torque or even applying negative starter motor torque after the engine 12 reaches cranking speed before reaching the desired idle speed to control the engine speed flare. This includes operating the starter 40 in a torque-controlled or speed-controlled mode so that the engine startup acceleration profile can be controlled till the engine 12 reaches a desired idle speed.

In response to a command to execute an engine starting event, a desired engine speed profile is selected, and the pinion actuator is controlled to meshingly engage the pinion with the flywheel of the engine. The rotor position sensing circuit monitors the rotational speed of the rotor of the electric motor, and the inverter operates in closed-loop control to control the electric motor to spin the engine responsive to the desired engine speed profile based upon the monitored rotational speed of the rotor of the electric motor. The inverter is controlled to control the electric motor including reducing starter torque or inducing negative starter torque to minimize engine speed flare associated with engine firing.

Figure 61:
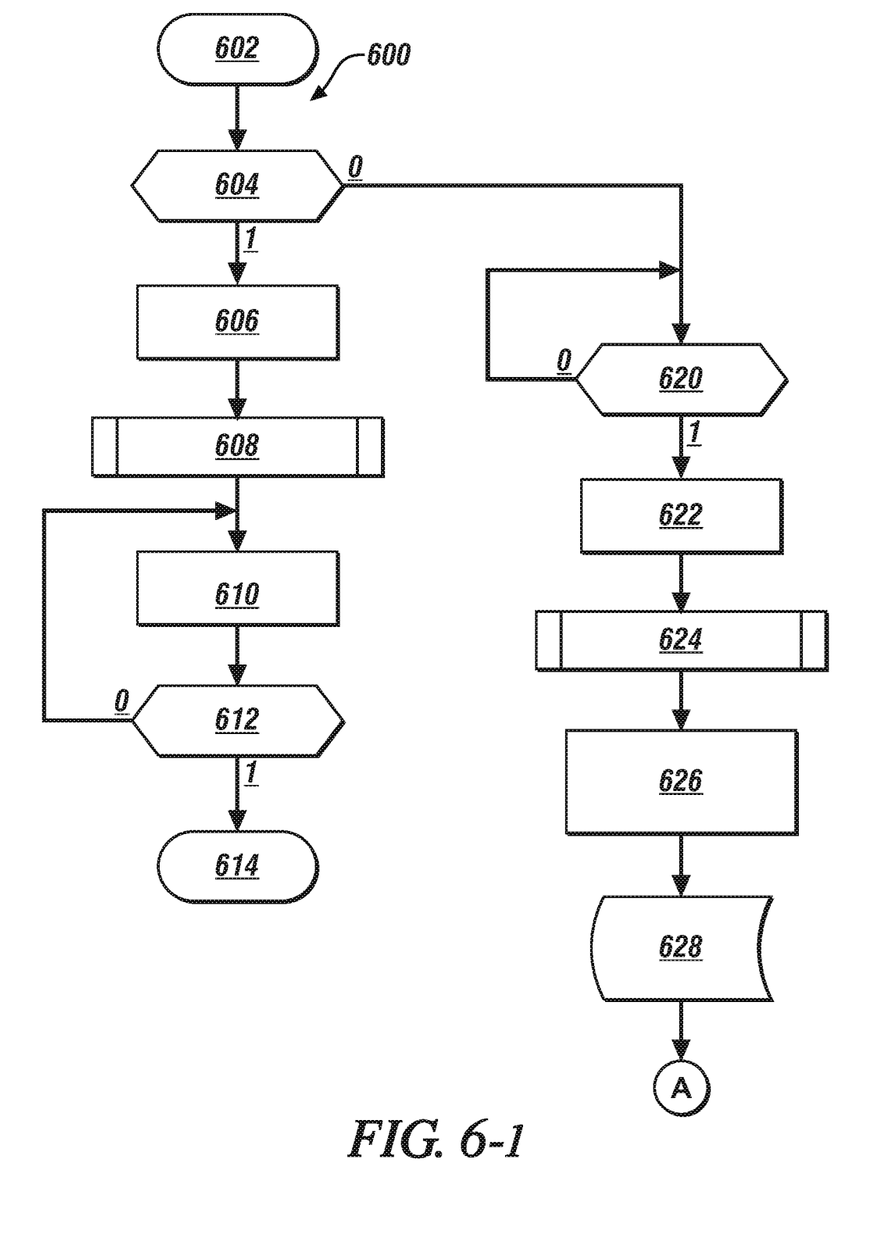

FIG. 6-1 schematically shows an engine start control routine 600 for controlling, via controller 36, an embodiment of the starter 40 during an engine starting event as part of an effort to effect starting of an embodiment of the internal combustion engine 12. Table 1 is provided as a key wherein the numerically labeled blocks and the corresponding functions are set forth as follows, corresponding to the engine start control routine 600. The teachings may be described herein in terms of functional and/or logical block components and/or various processing steps. It should be realized that such block components may be composed of hardware, software, and/or firmware components that have been configured to perform the specified functions, and may be executed in the controller 36, or in another controller.

TABLE 1

| BLOCK | BLOCK CONTENTS |
|---|---|
| 602 | Receive Engine start command |
| 604 | Select Key Crank start or autostart |
| 606 | Key Crank Start |
|  | Engage pinion solenoid |
| 608 | Execute time delay |
| 610 | Control starter responsive to a maximum torque profile |
| 612 | Is target engine idle speed achieved? |
| 614 | End start event |
| 620 | Autostart? |
| 622 | Engage pinion solenoid |
| 624 | Execute time delay |
| 626 | Select autostart type |
| 628 | Select engine starting profile |

Execution of the engine start control routine 600 may proceed as follows. The steps of the engine start control routine 600 may be executed in a suitable order, and are not limited to the order described with reference to FIG. 6. As employed herein, the term "1" indicates an answer in the affirmative, or "YES", and the term "0" indicates an answer in the negative, or "NO".

An engine starting event includes engaging the pinion solenoid 82 to extend the pinion gear 44 to meshingly engage the external ring gear 12A, and then controlling the starter system 40 to spin the engine 12, followed by fueling and firing the engine 12 to achieve a target engine idle speed. The engine start control routine 600 executes the engine starting event in response to receiving an engine start command (602), which initially determines whether the start command includes an operator-initiated engine start event (Key Crank) (604)(1) or an autostart engine start event (604)(0). When the start command is an operator-initiated engine start event (Key Crank) (604)(1), the routine initially engages the pinion solenoid 82 to extend the pinion gear 44 to meshingly engage the external ring gear 12A that is attached to the crankshaft flywheel (606), which includes executing a predetermined time delay (608) to allow for delays associated with electromechanical actions of activating the pinion solenoid 82 to urge the pinion gear 44 and overcome any resistance from the spring 43. Operation of the starter system 40 is controlled to spin the engine 12 responsive to a maximum torque profile (610) until the engine 12 is fueled, fired, and achieves a target engine idle speed (612), at which point (612)(1) the engine start event ends (614). Controlling the starter system 40 responsive to the maximum torque profile (610) includes controlling the starter inverter 140 to maximize transfer of three-phase electric power to the multi-phase brushless electric motor 54 of the starter 40 to spin the pinion gear 44, and thus spin the external ring gear 12A that is attached to the crankshaft flywheel of the engine 12 during the engine starting event.

When the start command is an autostart engine start event (604)(0), the routine confirms the autostart engine start event (620)(0) and (620)(1), and then engages the pinion solenoid 82 to extend the pinion gear 44 to meshingly engage the external ring gear 12A that is attached to the crankshaft flywheel (622), which includes executing a predetermined time delay (624) to allow for delays associated with electromechanical actions of activating the pinion solenoid 82 to urge the pinion gear 44 and overcome any resistance from the spring 43. The routine determines the type of autostart engine start event, e.g., a normal autostart event, an aggressive autostart event, or an extended autostart event, parameters of which are each defined based upon engine acceleration (626). Non-limiting examples of engine starting profiles in the form of acceleration profiles and speed profiles associated with different types of autostart events are depicted and described with reference to FIG. 7. A desired input acceleration profile associated with the selected type of autostart engine start event is determined (628), and includes one of a speed control-based autostart routine (640) and a torque control-based autostart routine (630).

Figure 62:
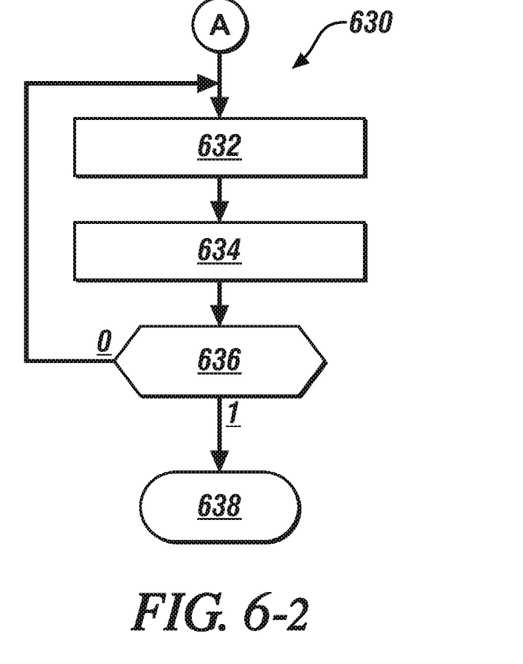

FIG. 6-2 schematically shows an embodiment of the torque control-based autostart routine (630) to control an embodiment of the starter 40 as part of an effort to effect starting of an embodiment of the internal combustion engine 12. Table 2 is provided as a key wherein the numerically labeled blocks and the corresponding functions are set forth as follows. The teachings may be described herein in terms of functional and/or logical block components and/or various processing steps. It should be realized that such block components may be composed of hardware, software, and/or firmware components that have been configured to perform the specified functions, and may be executed in the controller 36, or in another controller.

TABLE 2

| BLOCK | BLOCK CONTENTS |
|---|---|
| 630 | Torque control-based autostart routine |
| 632 | Determine acceleration error |
|  | $Accel_{err} = Accel_{cmd} - Accel_{actual}$ |
| 634 | Determine torque command |
|  | $Tcmd = Kp*Accel_{err} + ki \int Accel_{err}\, dt$ |
| 636 | Is target idle speed reached? |
| 638 | End torque-control based autostart routine |

The torque control-based autostart routine (630) is a closed-loop control routine that incorporates a selected one of the acceleration profiles and speed profiles that are associated with different types of autostart events that are described with reference to FIG. 7. In one embodiment and as described herein, the closed-loop control routine is a proportional-integral closed-loop control routine that executes control based upon an acceleration error. Execution includes determining an acceleration error (632) as follows:

$$Accel_{err} = Accel_{cmd} - Accel_{actual}$$

wherein:
$Accel_{err}$ represents the acceleration error,
$Accel_{cmd}$ represents the commanded acceleration, which is determined from the acceleration profile, and
$Accel_{actual}$ represents the actual acceleration as measured via the rotor position sensing circuit 88.

A torque command for controlling the starter inverter 140 can be determined based upon the acceleration error, as follows:

$$Tcmd = Kp^* Accel_{err} + ki \int Accel_{err} dt$$

wherein:
Tcmd is the torque command, and
Kp and ki are application-specific scalar terms.

The torque command is communicated to the starter controller 36 to control operation of the starter inverter 140 to control the three-phase electric power to the multi-phase brushless electric motor 54 of the starter 40 to spin the pinion gear 44, and thus spin the external ring gear 12A that is attached to the crankshaft flywheel of the engine 12 during the engine starting event.

The rotational speed of the starter 40 and hence the engine 12 is monitored to determine whether a target idle speed has been reached (636). When the target idle speed has not been reached (636)(0), the closed-loop operation continues, repeating steps 632, 634 and 636. When the target idle speed has been reached (636)(1), the autostart event ends with the engine 12 operating (638), and the starter 40 is deactivated, leading to retraction of the pinion gear 44 and other actions.

One subtlety of the torque control-based autostart routine (630) is that the acceleration error $Accel_{err}$, and hence the torque command Tcmd can be positive, i.e., a command for increased or additional torque, or negative, i.e., a command for decreased torque. The positive torque command includes transferring positive torque from the starter 40 to the internal combustion engine 12 to increase the rotational speed thereof. The negative torque command includes transferring negative torque from the starter 40 to the internal combustion engine 12 to decrease the rotational speed thereof, such as in response to an engine speed flare event that may occur when the engine 12 is fueled and fired. This action is facilitated by the direct mechanical connection of the pinion gear 44 to the rotor shaft 58B of the electric motor 54 via the planetary gear set 42 without an intervening one-way clutch or another form of overrunning clutch interposed therebetween. The control of the starter 40 in response to the negative torque command, such as in response to occurrence of an engine speed flare, results in a smoother speed profile and associated improvement in operator-perceived quality of the autostart event.

Figure 63:
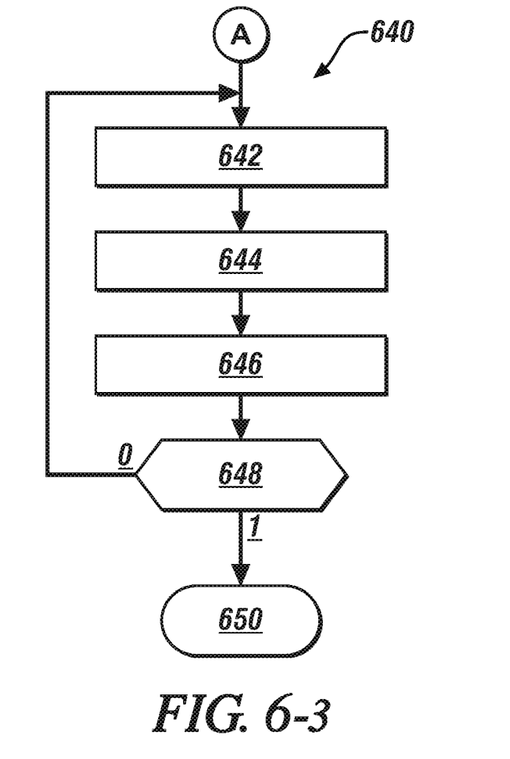

FIG. 6-3 schematically shows a portion of the engine start control routine 600 that includes executing the speed control-based autostart routine (640) to control an embodiment of the starter 40 as part of an effort to effect starting of an embodiment of the internal combustion engine 12. Table 3 is provided as a key wherein the numerically labeled blocks and the corresponding functions are set forth as follows. The teachings may be described herein in terms of functional and/or logical block components and/or various processing steps. It should be realized that such block components may be composed of hardware, software, and/or firmware components that have been configured to perform the specified functions, and may be executed in the controller 36, or in another controller.

TABLE 3

| BLOCK | BLOCK CONTENTS |
| --- | --- |
| 640 | Speed control-based autostart routine |
| 642 | Determine motor speed command based upon the acceleration profile |
| 644 | Determine speed error |

TABLE 3-continued

| BLOCK | BLOCK CONTENTS |
| --- | --- |
| | $\omega_{err} = \omega_{cmd} - \omega_{actual}$ |
| 646 | Determine torque command |
| | Tcmd = Kp* $\omega_{err}$ + ki $\int \omega_{err}$ dt |
| 648 | Is target idle speed reached? |
| 650 | End speed-control based autostart routine |

The speed control-based autostart routine (640) is a closed-loop control routine that incorporates a selected one of the acceleration profiles and speed profiles that are associated with different types of autostart events that are described with reference to FIG. 7. In one embodiment and as described herein, the closed-loop control routine is a proportional-integral closed-loop control routine that executes control based upon a speed error. Execution includes dynamically determining a motor speed command from the speed profile (642), and then determining a speed error (644) as follows:

$$\omega_{err} = \omega_{cmd} - \omega_{actual}$$

wherein:
$\omega_{err}$ represents the speed error,
$\omega_{cmd}$ represents the commanded speed, which is determined from the speed profile, and
$\omega_{actual}$ represents the actual speed as measured via the rotor position sensing circuit 88.

A torque command for controlling the starter inverter 140 can be determined based upon the speed error, as follows:

$$Tcmd = Kp^* \omega_{err} + ki \int \omega_{err} dt$$

wherein:
Tcmd is the torque command, and
Kp and ki are application-specific scalar terms.

The torque command is communicated to the starter controller 36 to control operation of the starter inverter 140 to control the three-phase electric power to the multi-phase brushless electric motor 54 of the starter 40 to spin the pinion gear 44, and thus spin the external ring gear 12A that is attached to the flywheel to spin the engine 12 during the engine starting event.

The rotational speed of the starter 40 and hence the engine 12 is monitored to determine whether a target idle speed has been reached (636). When the target idle speed has not been reached (648)(0), the closed-loop operation continues, repeating steps 642, 644, 646 and 648. When the target idle speed has been reached (648)(1), the autostart event ends with the engine 12 operating (650), and the starter 40 is deactivated, leading to retraction of the pinion gear 44 and other actions.

One subtlety of the speed control-based autostart routine (640) is that the speed error Wen, and hence the torque command Tcmd can be positive, i.e., a command for increased speed, or negative, i.e., a command for decreased speed. The positive speed command includes increasing the speed of the starter 40 to increase the rotational speed of the internal combustion engine 12. The negative speed command includes decreasing the speed of the starter 40, such as in response to an engine speed flare event that may occur when the engine 12 is fueled and fired. This action is facilitated by the direct mechanical connection of the pinion gear 44 to the rotor shaft 58B of the electric motor 54 via the planetary gear set 42 without an intervening one-way clutch or another form of overrunning clutch interposed therebetween. The control of the starter 40 in response to the negative speed command, such as in response to occurrence of an engine speed flare, results in a smoother speed profile and associated improvement in operator-perceived quality of the autostart event.

Figure 7:
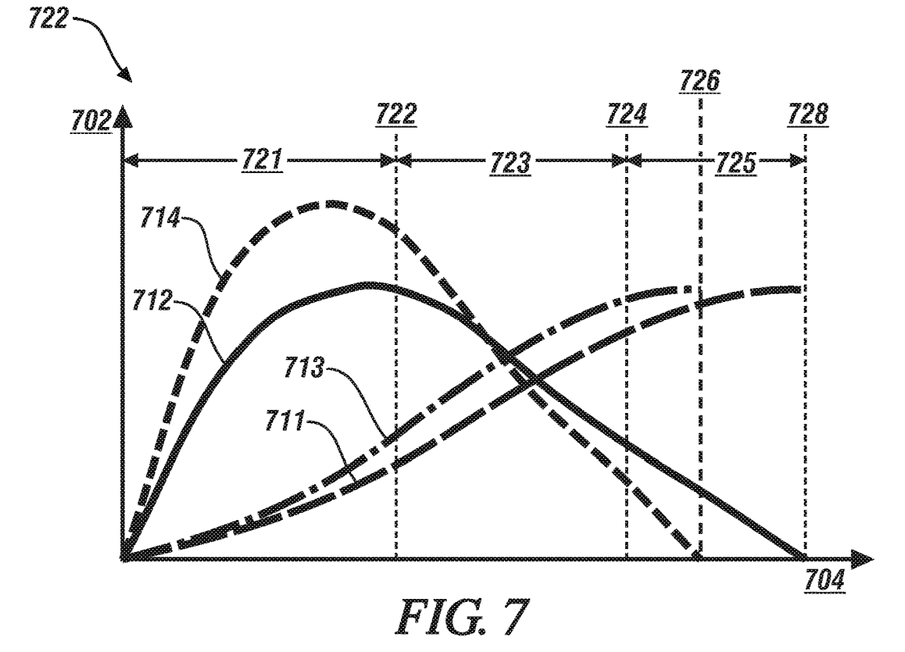
FIG. 7 graphically shows a first speed profile and associated first acceleration profile, and a second speed profile and associated second acceleration profile that are associated with different types of engine autostart events.

FIG. 7 graphically shows examples of engine starting profiles, including two desired engine speed profiles and two desired engine acceleration profiles that are associated with different types of autostart events, wherein speed and acceleration are shown on the vertical axis 702 in relation to time during an engine starting event, which is shown on the horizontal axis 704. Plotted results include a first speed profile 711 and associated first acceleration profile 712, and a second speed profile 713 and associated second acceleration profile 714. The first speed profile 711 and first acceleration profile 712 are associated with a nominal launch, such as in response to a low operator input to the driver input pedal(s) 38. The second speed profile 713 and associated second acceleration profile 714 are associated with an aggressive launch, such as in response to a high operator input to the driver input pedal(s) 38.

The two desired engine speed profiles and two desired engine acceleration profiles are indicated by a first period 721, a second period 723 and a third period 725 which ends when the engine speed achieves a desired engine idle speed. The first period 721 is associated with spinning of the engine 12 prior to fueling and firing the engine 12. As appreciated, the first acceleration profile 712 increases at a lower rate than the second acceleration profile 714, resulting in a lower engine speed at the point in time at which engine fueling and firing is initiated. At timepoint 722, the engine controller initiates engine fueling and firing, thus initiating the second period 723. At timepoint 724, the engine controller detects engine firing and begins to control fueling and spark timing to achieve engine idle speed, which is indicated at timepoint 726 for the aggressive launch associated with the second speed profile 713 and associated second acceleration profile 714, and is also indicated at timepoint 728 for the normal launch associated with the first speed profile 711 and associated first acceleration profile 712.

It should be appreciated that the desired engine speed for starting the engine 12 varies with changing conditions, such as a temperature of various vehicle systems. Accordingly, the rotational engine speed profile may be determined based on the current operating conditions of the engine 12 and the vehicle, including but not limited to, an ambient temperature or a clutch torque limit. Accordingly, the rotational engine speed profile represents the desired path or increase in the rotational speed of the starter 40 in order to increase the rotational speed of the engine 12 to the desired engine speed for starting the engine 12 responsive to the operating conditions. The rotational engine speed profile varies the rotational speed of the engine 12 during the engine starting event to achieve the desired engine speed. Accordingly, it should be appreciated that the desired engine speed is not a constant rotational speed during each engine starting event, but rather varies or changes during each engine starting event, and is the end result that is achieved by the engine speed profile. Furthermore, it should be appreciated that the rotational engine speed profile is not constant between different engine starting events, but is defined for each engine starting event based on the specific operating conditions of the engine and vehicle at that time.

Figure 8:
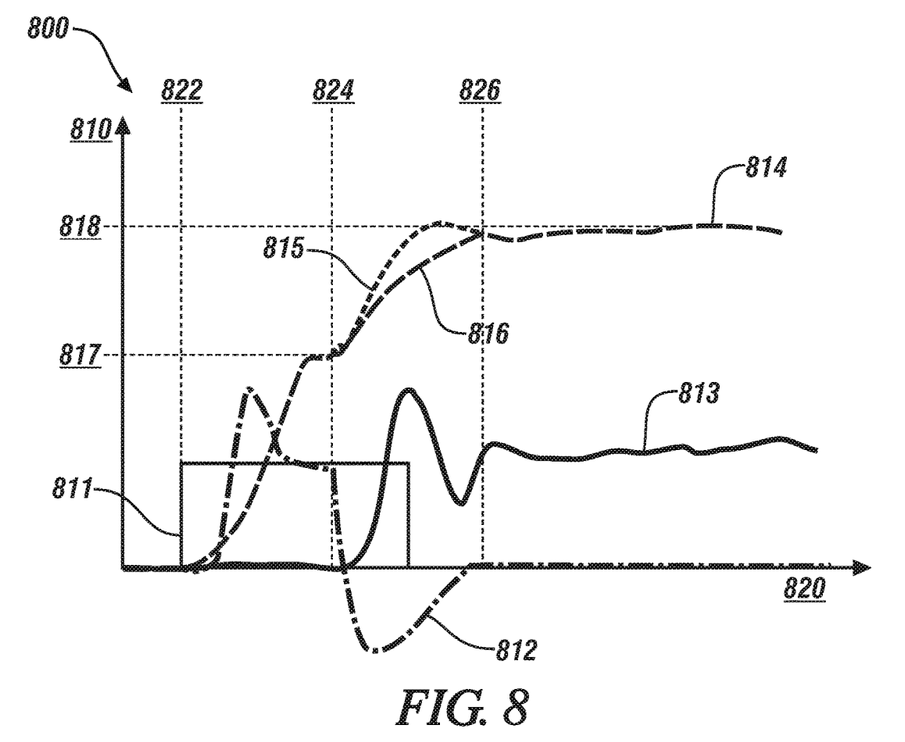
FIG. 8 graphically shows engine autostart control and operating parameters in relation to time during an engine starting event for an embodiment of the engine and starter employing the engine start control routine described with reference to FIGS. 6-1, 6-2 and 6-3.

FIG. 8 graphically shows data 800 associated with engine autostart control and operating parameters in relation to time during an engine starting event for an embodiment of the engine 12 and associated starter 40 that are described herein, employing the engine start control routine 600 associated with FIGS. 6-1, 6-2 and 6-3. Parameter magnitudes are indicated with reference to the vertical axis 810, and time is indicated on the horizontal axis 820. Monitored parameters include an autostart command 811, starter torque 812, engine torque 813, and engine speed 814. The engine speed includes an uncontrolled engine speed portion 815 during an engine speed flare event, and a controlled engine speed portion 816 during the engine speed flare event, wherein the controlled engine speed portion 816 includes that portion of the autostart start operation that is subjected to that portion of the engine start control routine 600 that includes executing the speed control-based autostart routine (640).

The engine autostart event is initiated at timepoint 822, as indicated by the step change in the autostart command 811. The starter torque 812 increases soon thereafter, with a corresponding increase in the engine speed 814. Engine torque remains at zero. At timepoint 824, the engine speed 814 achieves a crank speed 817 that is associated with the capability of the starter 40, and engine fueling is initiated, with corresponding increases in engine torque 813 and engine speed 814, and occurrence of an associated engine speed flare event. The uncontrolled engine speed portion 815 during the engine speed flare event is indicated, and represents the engine speed that can occur without employing the engine start control routine 600.

However, with operation of the engine start control routine 600 during this portion of the engine starting event, the starter 40 receives a negative torque command to transfer negative torque from the starter 40 to the internal combustion engine 12 to decrease the rotational speed thereof. During the controlled engine speed portion 816 during the engine speed flare event, engine speed can be controlled by the operation of the starter 40 to avoid any increase in engine speed that would otherwise happen. At timepoint 826, engine speed achieves a target engine idle speed value 818, and the starter 40 is controlled such that torque is no longer transferred from the starter 40 to the internal combustion engine 12, and the pinion gear 44 can be disengaged.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished employing a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A starter system for an internal combustion engine, comprising:
    a starter, including a multi-phase brushless electric motor and an electronic commutator assembly connected to the electric motor, wherein the electronic commutator assembly includes a rotor position sensing circuit and a starter inverter, and wherein the starter is controllable to engage a rotatable member of the internal combustion engine; and
    a controller, operatively connected to the starter inverter and in communication with the rotor position sensing circuit, the controller including an instruction set that is executable in response to a command to execute an engine starting event, the instruction set executable to:
        determine a desired starting profile for the internal combustion engine,
        control the starter to engage the rotatable member of the internal combustion engine,
        monitor, via the rotor position sensing circuit, rotational speed of the electric motor, and
        dynamically control the starter inverter to control the electric motor to spin the rotatable member of the internal combustion engine responsive to the desired starting profile;
    wherein the starter inverter is dynamically controlled to control the electric motor to induce a negative torque to control the spin of the rotatable member of the internal combustion engine responsive to the desired starting profile to prevent occurrence of an engine speed flare event during the engine starting event.

2. The starter system of claim 1, wherein the instruction set includes a closed-loop control routine that is executable to dynamically control the starter inverter to control the electric motor to spin the rotatable member of the internal combustion engine responsive to the desired starting profile based upon the rotational speed of the rotor of the electric motor.

3. The starter system of claim 2, wherein the desired starting profile for the engine comprises a desired speed profile.

4. The starter system of claim 1, wherein the starter includes a retractable pinion gear that is selectively extendable to meshingly engage the rotatable member of the internal combustion engine.

5. The starter system of claim 4, wherein the pinion gear is mechanically connected to a rotor shaft of the electric motor without an overrunning clutch interposed therebetween.

6. The starter system of claim 1, wherein the rotatable member of the internal combustion engine comprises a flywheel coupled to a crankshaft.

7. The starter system of claim 1, wherein the starter inverter is dynamically controlled to control the electric motor to control the spin of the rotatable member of the internal combustion engine responsive to the desired starting profile to prevent occurrence of the engine speed flare event, wherein the engine speed flare event includes uncontrolled engine speed that is associated with engine firing during the engine starting event.

8. A method for operating a starter for an internal combustion engine, wherein the starter includes a multi-phase brushless electric motor and an electronic commutator assembly connected to the electric motor, a rotor position sensing circuit and a starter inverter, the method comprising:
    determining a command to execute an engine starting event;
    determining a desired starting profile for the internal combustion engine,
    controlling the starter to engage a rotatable member of the internal combustion engine,
    monitoring, via the rotor position sensing circuit, rotational speed of the electric motor,
    dynamically controlling the starter inverter to control the electric motor to spin the rotatable member of the internal combustion engine responsive to the desired starting profile; and
    controlling the spin of the rotatable member of the internal combustion engine responsive to the desired starting profile to induce a negative torque to prevent occurrence of an engine speed flare event during the engine starting event.

9. The method of claim 8, wherein dynamically controlling the starter inverter comprises executing a closed-loop control routine to dynamically control the starter inverter to control the electric motor to spin the rotatable member of the internal combustion engine responsive to the desired starting profile based upon the rotational speed of the rotor of the electric motor.

10. The method of claim 9, wherein the desired starting profile for the engine comprises a desired speed profile.

11. The method of claim 8, further comprising the starter inverter being dynamically controlled to control the electric motor to induce a negative torque to control the spin of the rotatable member of the internal combustion engine to prevent occurrence of the engine speed flare event during the engine starting event.

12. A starter system for an internal combustion engine, comprising:
    a multi-phase brushless electric motor including a stator and a rotor disposed on a rotatable shaft;
    an electronic commutator assembly disposed on the electric motor, the electronic commutator assembly including a rotor position sensing circuit and a starter inverter;
    a pinion shaft rotatably coupled to the rotatable shaft of the rotor;
    a pinion gear slidably disposed on the pinion shaft and disposed to translate on the pinion shaft in response to an activation command to a pinion actuator;

the pinion gear disposed to translate on the pinion shaft to meshingly engage a flywheel of the internal combustion engine;

the pinion gear mechanically connected to the shaft of the rotor without an overrunning clutch interposed therebetween; and a controller in communication with the electronic commutator assembly and the rotor position sensing circuit, the controller including an instruction set that is executable in response to a command to execute an engine starting event, the instruction set being executable to:

determine a desired engine starting profile, control the pinion actuator to meshingly engage the pinion with the flywheel of the internal combustion engine, monitor, via the rotor position sensing circuit, rotational speed of the rotor of the electric motor, and control the starter inverter to control the electric motor to induce a negative torque to control spin of the flywheel of the internal combustion engine responsive to the desired engine starting profile based upon the rotational speed of the rotor of the electric motor;

wherein the control of the starter inverter to control the electric motor includes controlling engine speed to eliminate an engine speed flare associated with engine firing.

13. The starter system of claim 12, wherein the instruction set being executable to control the starter inverter to control the electric motor to spin the internal combustion engine responsive to the desired engine starting profile based upon the monitored rotational speed of the rotor of the electric motor comprises the instruction set being executable to execute a closed-loop control routine to dynamically control the starter inverter to control the electric motor to spin the rotatable member of the internal combustion engine responsive to the desired starting profile based upon the monitored rotational speed of the rotor of the electric motor.

14. The starter system of claim 13, wherein the desired starting profile for the engine comprises a desired speed profile.

15. The starter system of claim 13, wherein the starter inverter is dynamically controlled to control the electric motor to control the spin of the flywheel of the internal combustion engine responsive to the desired starting profile to prevent occurrence of the engine speed flare, wherein the engine speed flare includes uncontrolled engine speed that is associated with engine firing during the engine starting event.

* * * * *